(12) United States Patent
Zhu et al.

(10) Patent No.: US 7,617,737 B2
(45) Date of Patent: Nov. 17, 2009

(54) ADJUSTMENT OF PITCH AND ROLL STATIC TORQUES IN A DISK DRIVE HEAD GIMBAL ASSEMBLY

(75) Inventors: Li-Yan Zhu, San Jose, CA (US); Chao-Hui Yang, Milpitas, CA (US); Yen Fu, San Jose, CA (US); Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

(21) Appl. No.: 11/644,309

(22) Filed: Dec. 21, 2006

(65) Prior Publication Data
US 2008/0151430 A1    Jun. 26, 2008

(51) Int. Cl.
*G01L 1/24* (2006.01)
(52) U.S. Cl. ......................................... 73/800
(58) Field of Classification Search .................... 73/800
See application file for complete search history.

(56) References Cited

U.S. PATENT DOCUMENTS

| | | | | |
|---|---|---|---|---|
| 5,381,288 A * | 1/1995 | Karam, II | .................. | 360/245 |
| 5,787,570 A | 8/1998 | Ressmeyer et al. | ........ | 29/603.09 |
| 5,991,122 A * | 11/1999 | Tangren et al. | ........... | 360/244.2 |
| 6,154,952 A * | 12/2000 | Tangren | .................... | 29/603.04 |
| 6,917,497 B1 * | 7/2005 | Johnson et al. | .......... | 360/256.4 |
| 6,920,014 B2 * | 7/2005 | Sato et al. | ................. | 360/234.5 |
| 6,920,019 B2 * | 7/2005 | Martin et al. | ............... | 360/245 |
| 6,993,824 B2 * | 2/2006 | Childers et al. | .......... | 29/603.03 |
| 7,009,801 B2 * | 3/2006 | Pit et al. | ........................ | 360/75 |
| 7,021,097 B1 * | 4/2006 | Ubl et al. | ..................... | 72/31.1 |
| 7,027,141 B2 * | 4/2006 | Girard et al. | ............. | 356/237.1 |
| 7,119,979 B2 * | 10/2006 | Fong et al. | ..................... | 360/75 |
| 7,127,799 B2 * | 10/2006 | Girard et al. | ............... | 29/603.1 |
| 7,213,433 B2 * | 5/2007 | Ubl et al. | .................... | 72/342.1 |
| 7,219,413 B1 * | 5/2007 | Kinzer | ....................... | 29/603.1 |
| 7,249,520 B1 * | 7/2007 | Zhu et al. | ...................... | 73/760 |
| 7,330,338 B1 * | 2/2008 | Wick et al. | ................ | 360/245.7 |
| 2005/0165561 A1 | 7/2005 | Zeng | ............................ | 702/41 |

* cited by examiner

*Primary Examiner*—Lisa M Caputo
*Assistant Examiner*—Octavia Davis
(74) *Attorney, Agent, or Firm*—Saile Ackerman LLC; Stephen B. Ackerman; Rosemary L. S. Pike

(57) ABSTRACT

In a system and method for adjusting a static torque on a slider in a head-gimbal assembly, a substantially rigid mass is placed on an air-bearing surface (ABS) of a slider. A static attitude of the slider is measured, and an adjustment location and intensity for a flexure to yield a zero slider static attitude are calculated. The flexure is adjusted based on the measurement and calculations.

33 Claims, 10 Drawing Sheets

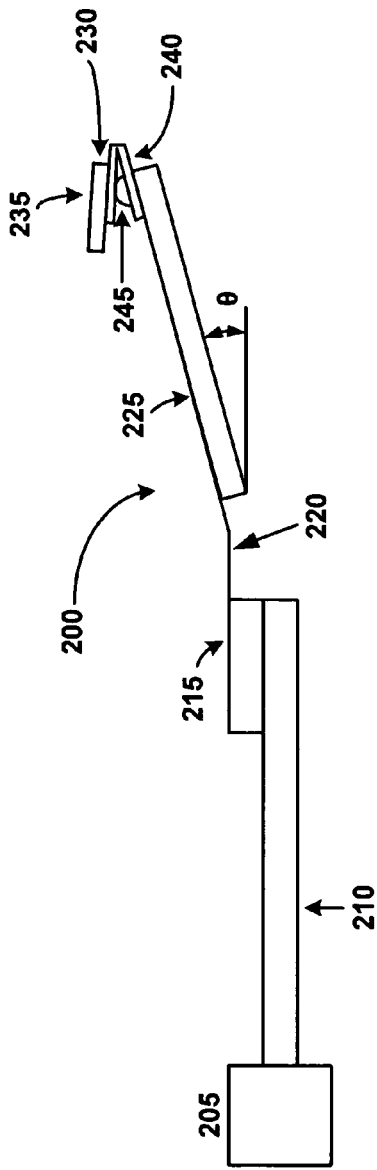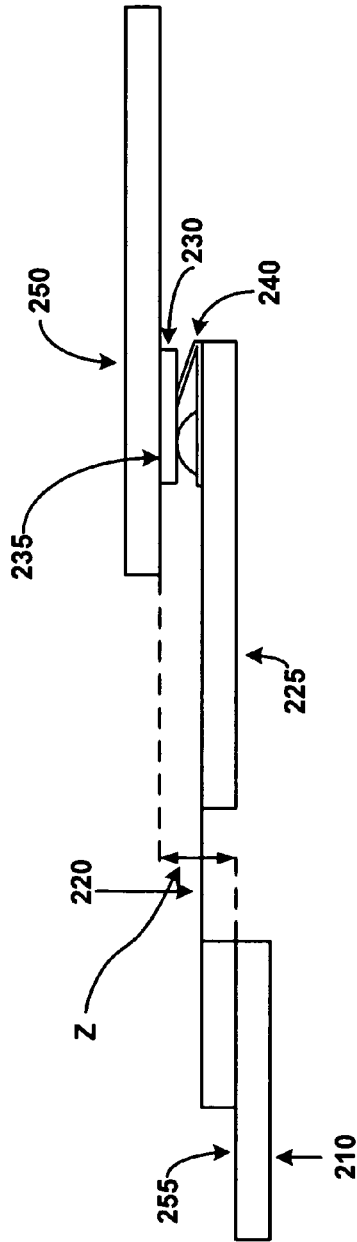
FIG. 2a (Prior Art)
FIG. 2b (Prior Art)

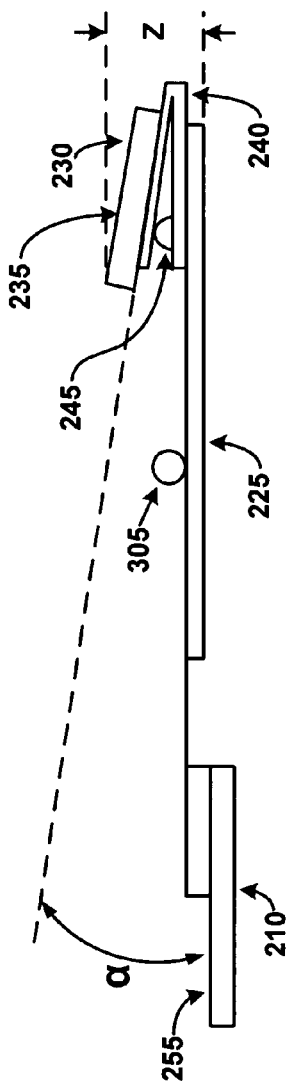
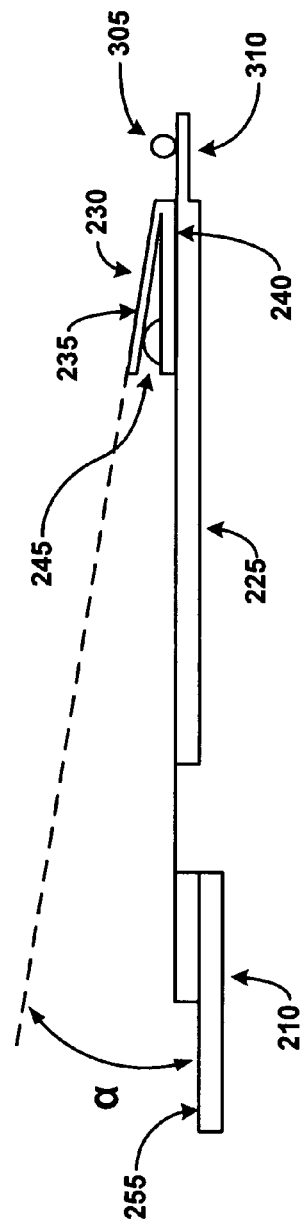
FIG. 3a (Prior Art)
FIG. 3b (Prior Art)

ADJUSTMENT OF PITCH AND ROLL STATIC TORQUES IN A DISK DRIVE HEAD GIMBAL ASSEMBLY

BACKGROUND INFORMATION

The present invention relates to magnetic hard disk drives. re specifically, the present invention relates to a method of adjusting the pitch and roll static torques in a disk drive head gimbal assembly.

FIG. 1 illustrates a hard disk drive design typical in the art. Magnetic recording hard disk drives 100 use a read/write transducer or head mounted on an air-bearing slider for reading and/or writing data to a disk. The slider is attached to an actuator arm by a suspension. The combination of the slider and suspension is called a head-gimbal assembly (HGA) 102. Generally, a disk drive 100 may have a stack of disks 101 and a stack of HGAs 102, with one HGA associated with each disk surface. The suspension may further include a load beam and a flexure. The flexure connects the slider to the load beam, maintaining the relative in-plane alignment between the flexure and the load beam, while permitting the slider to "pitch" and "roll" with respect to the load beam. The load beam typically consists of two rigid portions connected by at least one flexible portion. The flexible portion may be bent elastically to yield a reaction force (known in the art as the "gram load"), which is transmitted through a load dimple to the slider, causing the slider to be pressed against the disk. The gram load is entirely transmitted to and supported by the disk.

When the slider is loaded against a stationary disk, it is said to be in a "contact stop" state. Its pitch and roll angles are both zero. If the load beam is held at the same position by a support outside of the slider, and the disk is removed, the slider will no longer be subject to the gram load. Its pitch and roll angles with respect to a reference plane (which may represent the missing disk surface) are called pitch static attitude (PSA) and roll static attitude (RSA), respectively. PSA and RSA together may be called static attitudes. The change of pitch and roll angles includes pitch and roll torques, due to elastic deformation of the flexure.

When the slider is loaded on a rotating disk during normal operations, it does not contact the disk directly, but rides on a cushion or air bearing generated by the rotation of the disk. The air bearing generates both suction and lift forces which balance the gram load. The separation between the slider and the disk surface is called the flying height. It is generally extremely small (typically on the order of 10 nm in state-of-the-art disk drives). The slider pitch and roll angles are also much smaller than the static attitudes. The flying height, pitch, and roll together may be called the "flying attitudes." The flying attitudes are crucial to the performance and reliability of a disk drive. They may be influenced by factors such as the rotation speed of the disk, the aerodynamic shape of the air-bearing surface (ABS) of the slider, the gram load, and the pitch and roll torques applied to the slider by the suspension.

As described above, the pitch and roll torques are in part contributed by the flexure. Intuitively, the pitch and roll torques respectively equal the product of the flexure pitch or roll stiffness ($K_p$ or $K_r$) of the flexure and the corresponding pitch static attitude (PSA) or roll static attitude (RSA). Zeng notes that the flexure stiffness may differ significantly from suspension to suspension and discloses a method to measure the flexure stiffness during torque adjustment in U.S. Patent Application [Publication No. 2005/0165561 A1]. Flexure stiffness may also vary significantly as a function of pitch and roll angle. Zeng's method measures the flexure stiffness while the slider is unloaded, hence the pitch and roll angles equal PSA and RSA, respectively. The result may differ significantly from the average stiffness during loading, i.e., when the pitch and roll angles change from PSA and RSA to the flying attitudes. Thus, the result may not accurately describe pitch and roll momentum exerted by the flexure.

In addition, the dimple contact location on the slider may vary significantly due to manufacturing tolerance. The product of gram load and the corresponding dimple offset in the pitch or roll direction may contribute to the slider pitch and roll torques, respectively. This contribution is difficult to measure, because the contact point is between two opaque bodies and is invisible to common transducers. This contribution is unaccounted for by Zeng.

Conceptually, the resultant pitch and roll torques may be measured by loading the slider ABS on a plurality of independent force sensors. Decoupling of two contributors (static attitudes and dimple offset) and analysis of the stiffness variation are both unnecessary. The suspension may be simply adjusted until the desired resultant torques are achieved in pitch and roll directions. This approach has been attempted before. At least one equipment manufacturer, Matronics, see U.S. Pat. No. 5,787,570, has marketed a system based on multiple load-cell static torque measurements.

The concept of adjusting resultant torque is more desirable than adjusting the first contributor alone. However, multiple load-cell measurement is vulnerable to ABS friction, which may be difficult to avoid during the loading process. When the slider engages the load cells, its trajectory may often deviate from the ideal perpendicular path. Significant friction force may result. In contrast, a slider riding on an ABS may experience negligible friction. Multiplied by the distance between ABS and dimple contact, the extraneous ABS friction may create large pitch and roll torques which distort the measurement.

Thus, what is needed is an improved method of measuring slider pitch static torque (PST) and roll static torque (RST) so that they can be specified and adjusted. In particular, there is a need for an improved measurement technique which responds to both flexure deformation and load force offset and is unaffected by error associated with ABS friction.

BRIEF DESCRIPTION OF THE DRAWINGS

FIG. 2a illustrates one embodiment of a head-gimbal assembly (HGA).

FIG. 2b illustrates one embodiment of the relationship of an HGA to a stationary disk in a disk drive system.

FIG. 3a illustrates one embodiment of an HGA and shows the pitch static attitude for a slider.

FIG. 3b illustrates a side view of one embodiment of an HGA.

DETAILED DESCRIPTION

Figure 1:
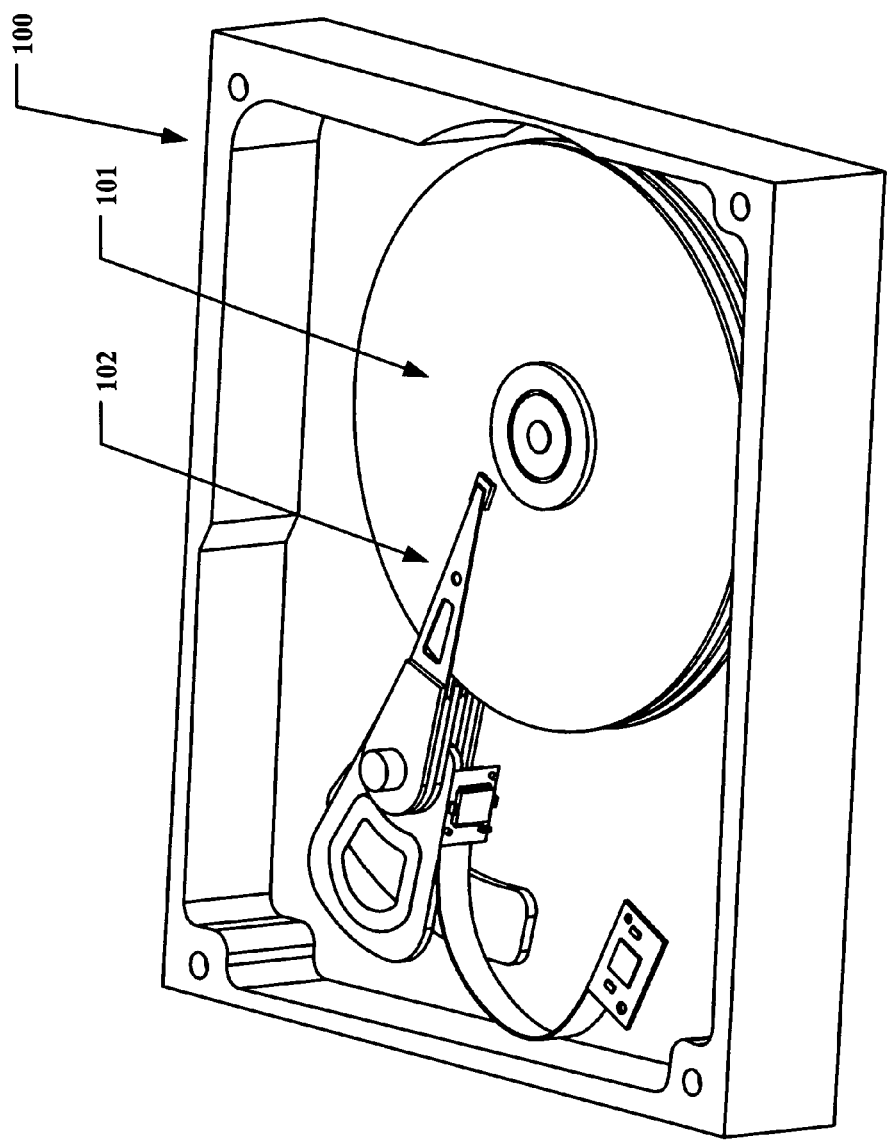
FIG. 1 illustrates a hard disk drive design typical in the art.

A system and method for adjusting a static torque on a slider in a head-gimbal assembly (HGA) are disclosed. A substantially rigid mass may be placed on an air-bearing surface (ABS) of a slider. A slider static attitude may be measured while the rigid mass is placed on the slider ABS. An adjustment intensity and adjustment location for a flexure may be calculated to yield a zero slider static attitude. The flexure may be adjusted based on the slider static attitude measurement and the adjustment calculations.

FIG. 2a illustrates one embodiment of a head-gimbal assembly (HGA). The HGA may include a load beam 225, a slider 230 with an air-bearing surface (ABS) 235, and a gimbal or flexure 240 coupling the slider 230 to the load beam 225. The load beam may include a hinged section 220 which is connected by a base plate 215 to an actuator arm 210. The actuator arm may be coupled to an actuator 205 which may move the slider 230 in a plane relative to the surface of a rotating disk in a disk drive system. The hinged section 220 may be bent such that the load beam 225 is angled by θ degrees compared to the base plate 215. The load beam 225 may be connected to the slider 230 through the flexure 240 and may also be connected to the slider via a dimple 245. The flexure 240 may be flexible and may allow the slider 230 to pitch (i.e., move about its x-axis) and roll (i.e., move about its y-axis) on the dimple. A reaction force, known in the art as a gram load, may result from the bent load beam. The gram load may offset the air bearing force generated from a rotating disk.

FIG. 2b illustrates one embodiment of the relationship of an HGA to a stationary disk in a disk drive system. In this embodiment, the slider 230 and the load beam 225 are bent down by stationary disk 250 such that the angle θ (as shown in FIG. 1) between the load beam 225 and the hinged section 220 is substantially zero. This position may be referred to as the "loaded state" for the slider 230 and load beam 225. A gram load may be transferred through the load beam 225 and the dimple 245 to the slider 230 as a result of resistance by the hinged section 220 to this deformation. The distance between the ABS 235 of the slider 230 and the top surface 255 of the actuator arm 210 may be referred to as the "z" height.

FIG. 3a illustrates one embodiment of an HGA and shows the pitch static attitude for a slider. The same "z" height as displayed in FIG. 2 may be obtained in this embodiment by holding the load beam 225 with a pin 305. The load beam 225 as held by the pin 305 may be in the loaded state, but the slider 230 and the flexure 240 are not in the loaded state. The angle α, shown in FIG. 3a as the arc between the ABS 235 of the slider 230 and the top surface 255 of the actuator arm 210, may denote the pitch static attitude (PSA) of the slider 230.

Although load beam 225 may be substantially rigid, it may still be mildly compliant. A bending moment in the section of load beam 225 between the pin 305 and the dimple 245 may cause some deformation, thus adversely affecting the measurement of the PSA. In practice, the rigidity of load beam 225 cannot be raised infinitely. However the distance between the pin 305 and the dimple 245 may be reduced. Since dimple 245 is not accessible to pin 305, the distance cannot be reduced to zero. FIG. 3b illustrates an alternative embodiment for preventing load beam deformation where the pin 305 may be placed on an integral load/unload tip 310, thereby reducing the distance between pin 305 and dimple 245.

Figure 4:
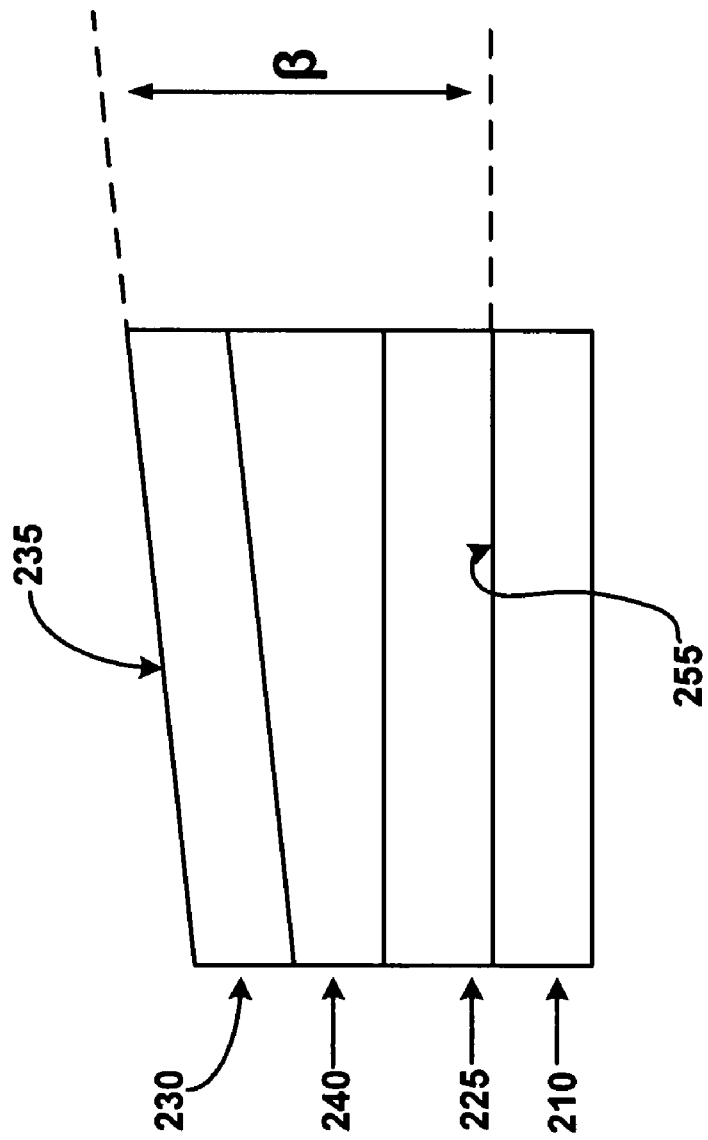
FIG. 4 illustrates an end view of one embodiment of an HGA and shows the roll static attitude for a slider.

FIG. 4 illustrates an end view of one embodiment of an HGA and shows the roll static attitude for a slider. The end view illustrates a slider 230, a flexure 240, a load beam 225, and an actuator arm 210 in a loaded state. The angle between the ABS 235 of the slider 230 and the top surface 255 of the actuator arm 210 is denoted as β and may refer to the roll static attitude (RSA) of the slider 230. The PSA and RSA together may be defined as "static attitude," with the PSA and RSA each considered as components of the term "static attitude."

Figure 5:
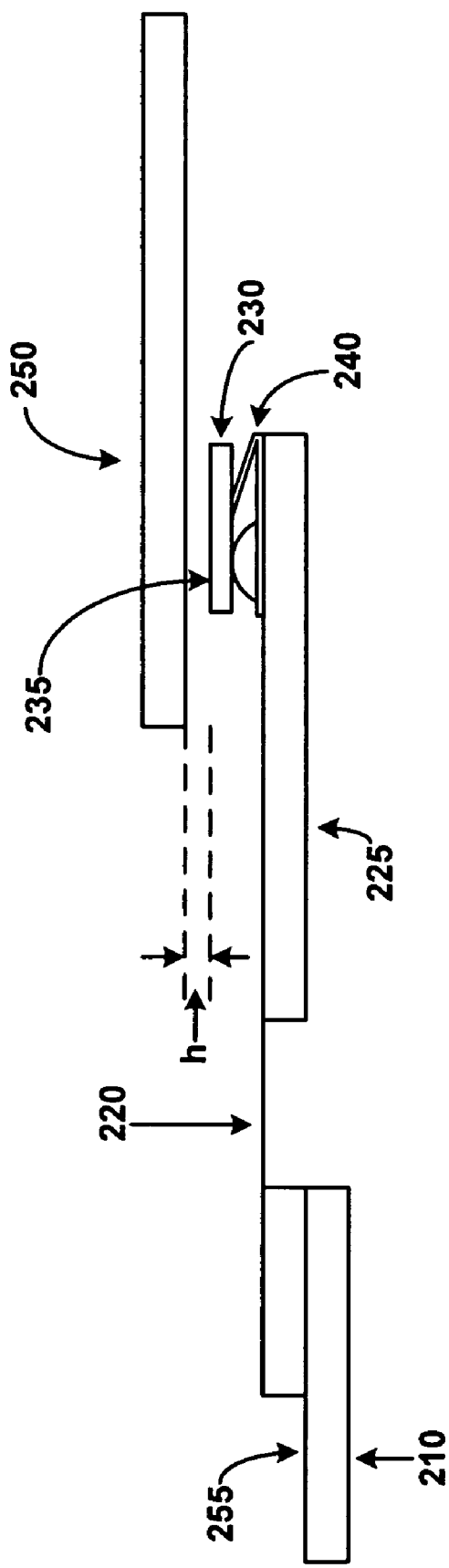
FIG. 5 illustrates one embodiment of the relationship of an HGA to a rotating disk in a disk drive system.

FIG. 5 illustrates one embodiment of the relationship of an HGA to a rotating disk in a disk drive system. The rotation of the disk 250 may create an air bearing force that pushes the slider 230 away from the disk 250. In response, the slider may "fly" at a distance "h" from the surface of the disk. The distance "h" between the ABS 235 of the slider 230 and the surface of the disk 250 may be known as the slider flying height. Variations in the flying height of a slider may adversely affect the data read from or written to the disk.

The force transmitted to the slider 230 by the load beam 225 and the pitch and roll torques exerted by the flexure 240 on the slider 230 may counter the air bearing force and may influence slider flying height. To adjust and control the slider flying height, the angle of the load beam 225 (θ) as bent by the flexible section of the load beam 220, the pitch static attitude (α), and the roll static attitude (β) may be adjusted. The adjustment of the angle θ may affect the gram load, and is well understood in the art. The PSA and RSA adjustments may affect the static pitch and roll torque. In the prior art, one approach for adjusting and controlling the slider flying height may involve having the flexure 240 exert the same pitch and roll torque for all HGAs. An implementation of this prior art approach may be to assume that the flexure pitch and roll stiffness are constants which do not vary from slider to slider, nor as a function of PSA and RSA. This approach however fails to account for the variation in dimple offset. Moreover, this prior art approach does not ensure that the desired static pitch and roll torque will be attained. A second and more complex implementation of the prior art approach is disclosed by Zeng, which measures flexure pitch and roll stiffness in situ, and adjusts the suspension until the desired static pitch and roll torque are attained. Zeng's implementation, however, fails to accounts for the variation of pitch and roll stiffness as a function of PSA and RSA. Further, the variation of pitch and roll torque due to dimple offset also is unaccounted for.

A second approach in the prior art for adjusting and controlling the slider flying height may measure the static pitch and roll torque in situ, and adjust the suspension until the desired static pitch and roll torque are attained. However, measurement of the static pitch and roll torque when the slider and load beam are in a loaded state may be difficult. Because the gram load may resist the deformation of the slider 230 and load beam 225 while in the loaded state and may keep the ABS 235 of the slider in contact with the disk 250 (see FIG. 2b), ABS friction may be introduced. ABS friction may adversely affect the pitch and roll torque measurement. To circumvent the problems associated with ABS friction and the measurement of pitch and roll torque while the slider and load beam are in a loaded state, the slider may be flown over a rotating disk and the fly height may be measured. While the slider is flying over the rotating disk, the suspension may be adjusted until the desired fly height is obtained. However, in practice, slider fly height measurement is slow and expensive, and suspension adjustment during flying may be economically infeasible.

Figure 6:
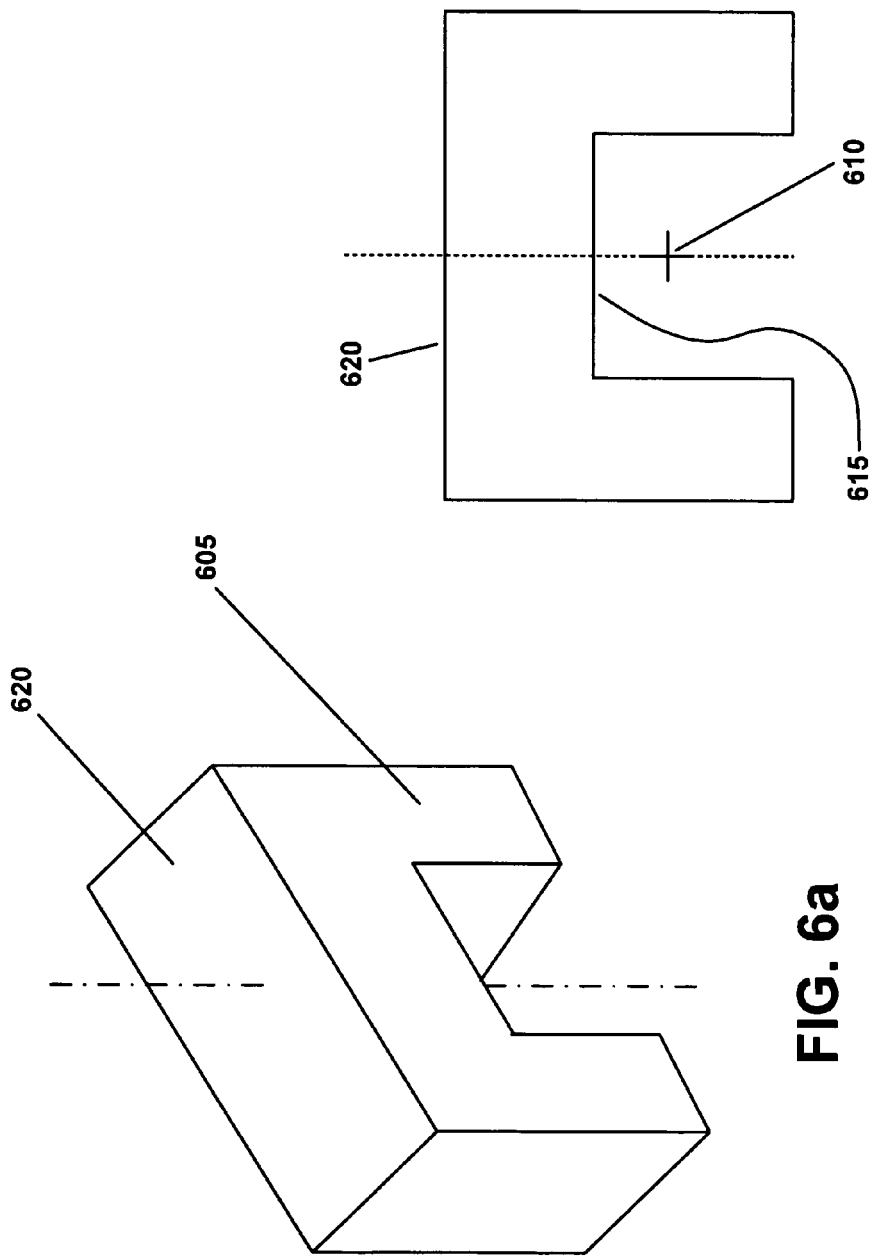
FIG. 6a illustrates an isometric drawing of one embodiment of a substantially rigid mass.
FIG. 6b illustrates one embodiment of a substantially rigid mass.

FIGS. 6a and 6b illustrate one embodiment of a substantially rigid mass. The rigid mass 605 may be placed on the slider ABS 235 to eliminate ABS friction. The mass 605 may have a weight equal to the gram load. When the slider ABS 235 is horizontal, there is no tendency for the mass 605 to slide over the ABS 235, and ABS friction is eliminated. The use of the substantially rigid mass 605 also circumvents the need for static pitch and roll torque measurement and suspension adjustment through slider fly height measurement by substituting the weight of the mass 605 for the air bearing force and measuring the slider pitch and roll instead of the fly height. The slider pitch and roll may be more indicative of static pitch and roll angles than the fly height. Further, the static pitch and roll may be easier to measure than the fly height due to the fact that the pitch and roll of the slider are visible compared to the fly height being concealed between the slider 230 and the disk 250. The slider pitch and roll also generally is larger (typically on the order of 30 mrad) than the fly height measurement (typically on the order of 10 nm).

The substantially rigid mass 605 may include a contact surface 615 which engages the slider ABS 235. The mass 605 may also include at least one reference surface 620 with a known angle of inclination to the contact surface 615. In one embodiment, the reference surface 620 may have a zero angle of inclination relative to the contact surface 615. The contact surface 615 of the mass 605 may be substantially flat to avoid rocking on the slider ABS 235, but may be sufficiently rough to minimize adhesion, otherwise known as stiction, to the slider ABS 235. At least a portion of the reference surface 620 may be specularly reflective. In one embodiment, the specularly reflective portion of the reference surface 620 may consist of a piece of scrap monocrystalline silicon chip.

The substantially rigid mass 605 may be shaped to provide access to flexure sites for PSA and RSA adjustment, and to avoid interference with the load beam 225 and the pin 305. The mass 605 may possess a center of mass 610, which may be substantially the same height as the apex of the dimple 245 such that pitch and roll momentum due to gravity is independent of the static attitudes. The mass 605 may be substantially rigid to maintain its shape, parallelism and the position of its center of mass 610. The mass may be non-magnetic or electrostatically non-chargeable to eliminate extraneous reaction force to magnetic and electrostatic forces.

Figure 7:
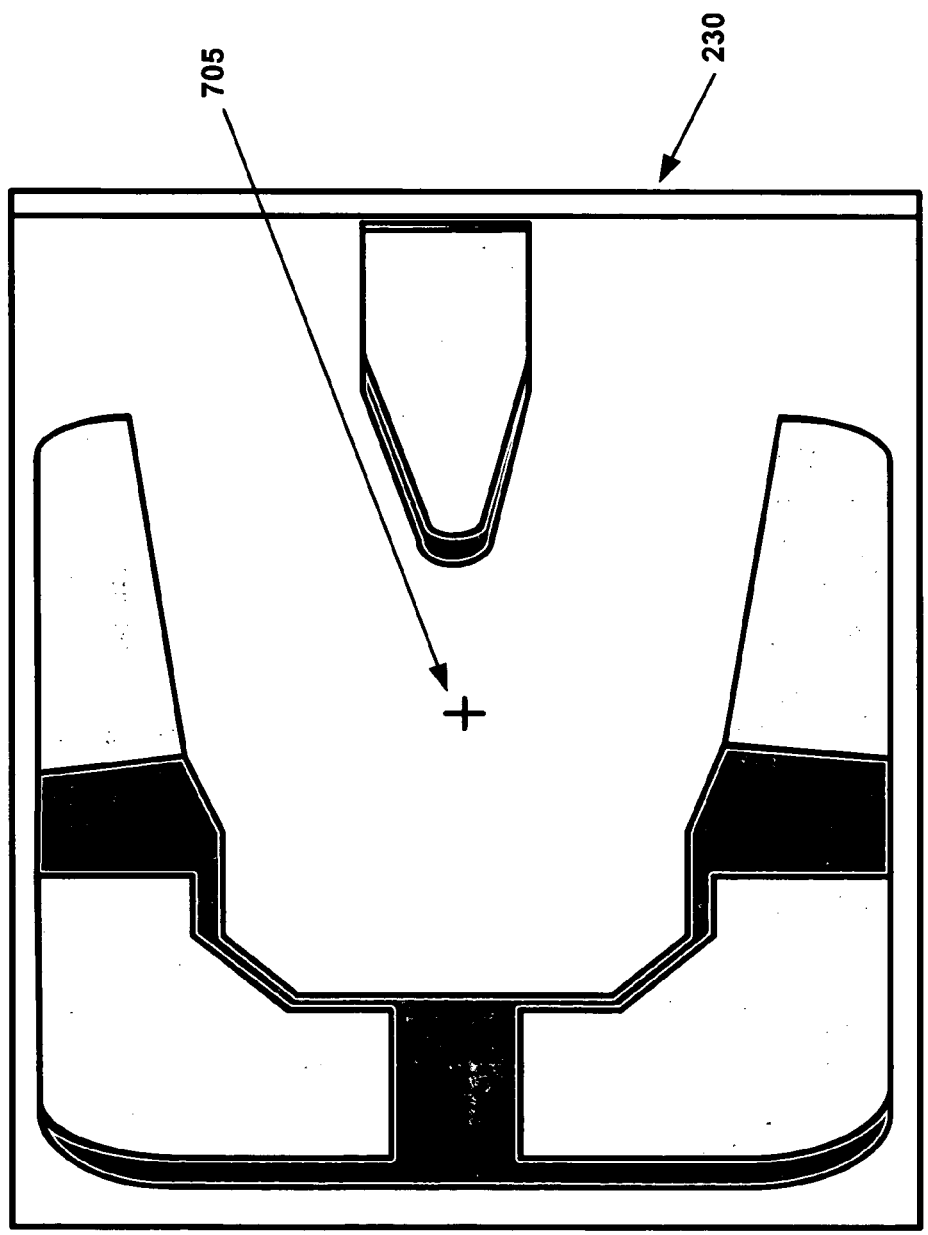
FIG. 7 illustrates a plan view of a slider ABS.

FIG. 7 illustrates a plan view of a slider ABS. By elementary statics, the suction and lift forces exerted by the air bearing on slider ABS 235 may be represented as a resultant force perpendicular to slider ABS 235 and acting through a point 705 on the ABS 235. Point 705 may be referred to as the center of ABS force. When the ABS 235 achieves a horizontal position, the resultant of air bearing forces is vertical. Thus, it may be replaced by the weight of rigid mass 605, provided that its center of mass 610 is vertically aligned with the center of ABS force 705.

Figure 8:
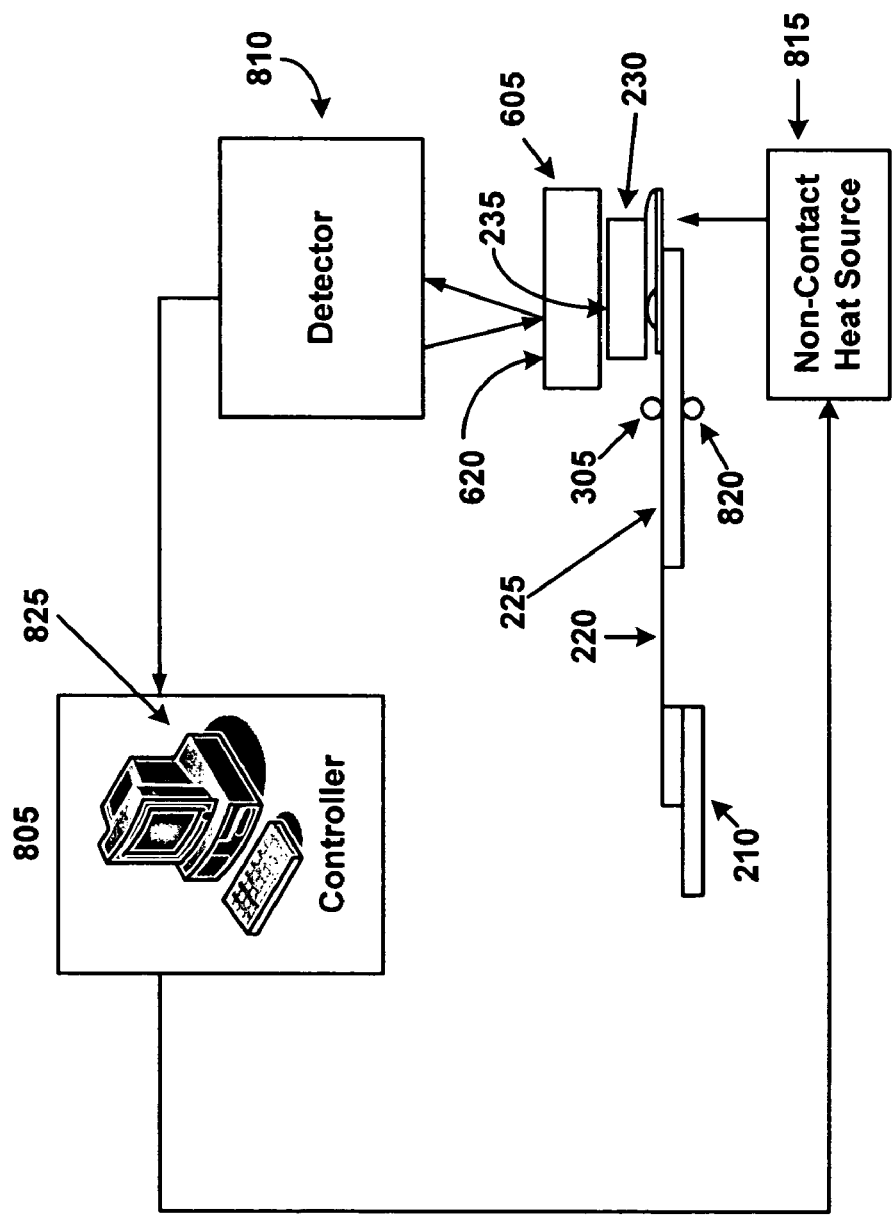
FIG. 8 illustrates one embodiment of a system for adjusting a flexure.

FIG. 8 illustrates one embodiment of a system for adjusting a flexure. A load beam 225 may be loaded with a pin 305 to achieve a desired "z" height. Mass 605 may be placed on the slider ABS 235 such that the center of the ABS force 705 and the center of the mass are vertically aligned. For clarity, portions of the mass 605 below the contact surface 615 are not shown. In one embodiment, manufacturing tolerances may cause the gram load supplied by the load beam 225 to be less than its nominal value. In this embodiment, the weight of the mass 605 may cause the load beam 225 to disengage from the pin 305, thus increasing "z" height and adversely affecting the measurement of angle α. An additional pin 820 positioned on the lower surface of the load beam 225 and opposite to pin 305 may rectify this problem.

A detector 810 may measure the pitch and roll angles. The detector may be a non-contact slope detector and may include a collimated light source, such as a laser diode, which is positioned to illuminate the reference surface 620 and project a pattern of reflected light onto an optical sensor, such as a quad-cell, a diode array, or a charge-coupled device. The pattern of reflected light may be compared to a standard pattern to determine the slider static attitude or slider pitch and roll angle. When the slider 230 is free of the gram load, the reported pitch and roll angles may equal RSA and PSA, respectively. However, when the slider 230 is loaded by mass 605, the ideal value of reported pitch and roll angles is zero. The actual reported pitch and roll angles may deviate from zero, due to manufacturing tolerances in PSA, RSA, pitch stiffness, roll stiffness, dimple offset, and gram load.

A controller 805 may receive and process information from the detector 810 and may control a non-contact heat source 815. In one embodiment, the controller 805 may include a desktop computer 825 having a keyboard for entering commands, a monitor for displaying system information, and a computer which includes a microprocessor-controlled motherboard, a hard disk drive, and a floppy disk drive. The controller 805 may also include software installed and running on the computer 825, to calculate desired location, intensity, and duration of heating based on the pitch and roll angles reported by the detector 810. The non-contact heat source 815 may receive instructions or commands from the controller 805 and may adjust the flexure accordingly. The non-contact heat source 815 may be an Excimer laser and may cause thermal expansion and deformation at selected sites of the flexure, resulting in slider static attitude adjustments. The adjustments may be repeated until the reported pitch and roll angles are substantially zero such that they meet their respective manufacturing tolerances.

Figure 9:
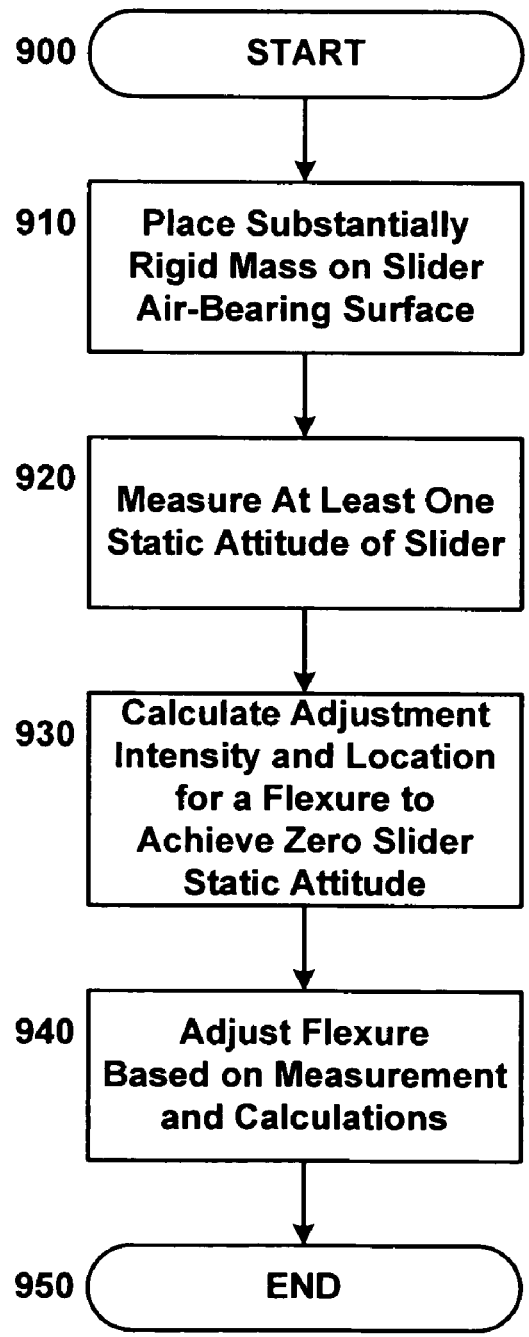
FIG. 9 illustrates in a flowchart one embodiment for adjusting a static torque on a slider in an HGA.

FIG. 9 illustrates in a flowchart one embodiment for adjusting a static torque on a slider in an HGA. In block 910, a substantially rigid mass may be placed on a slider ABS. In block 920, a slider static attitude may be measured. In block 930, an adjustment intensity and location may be calculated for a flexure to achieve a zero slider static attitude. The flexure may be adjusted based on the measurement and calculations in block 940.

Figure 10:
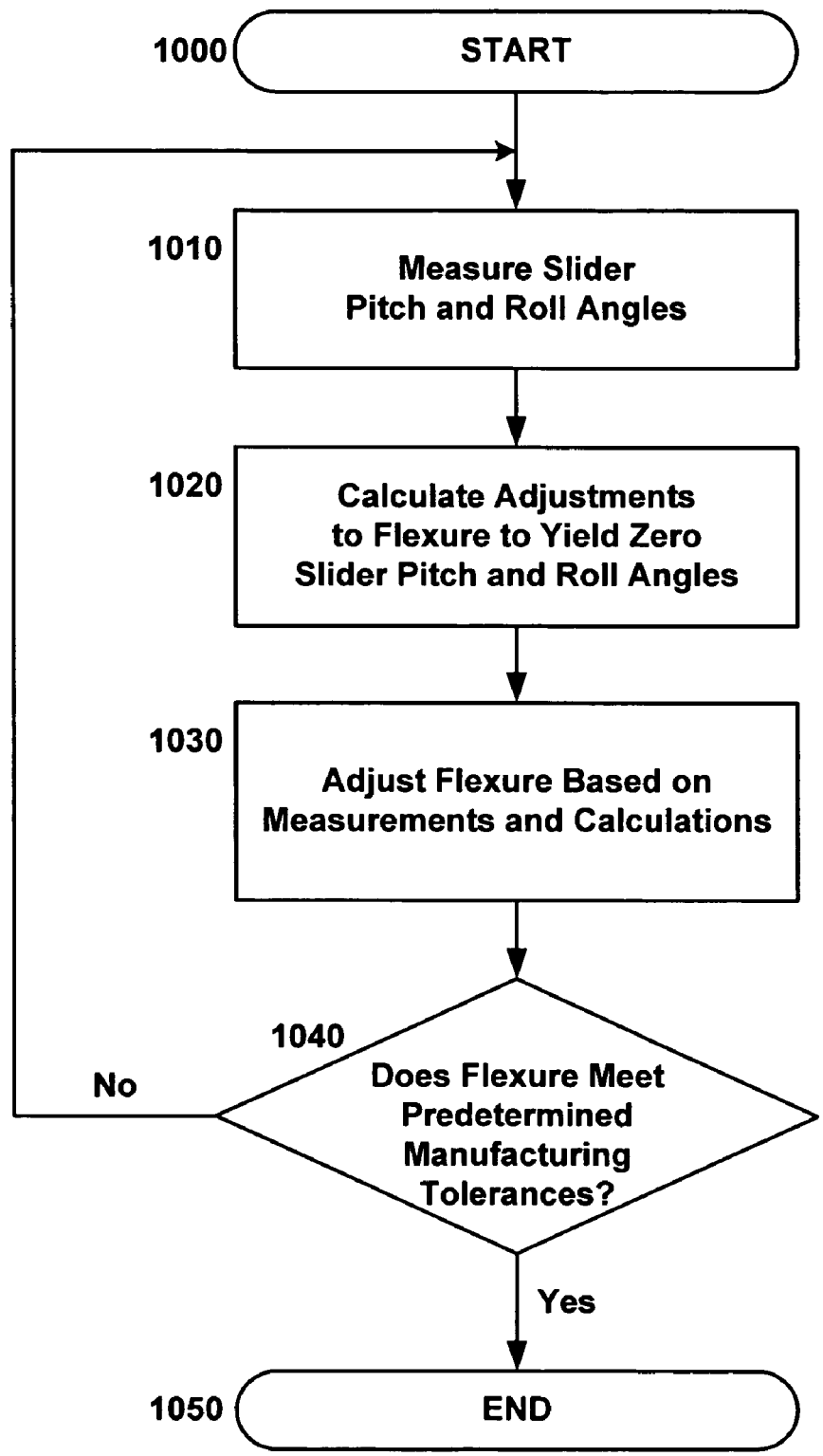
FIG. 10 illustrates in a flowchart one embodiment for adjusting a slider torque on a slider in an HGA.

FIG. 10 illustrates in a flowchart one embodiment for adjusting a static torque on a slider in an HGA. In block 1010, the pitch and roll angles of a slider may be measured. The slider may have an air-bearing surface and a center of air bearing forces vertically aligned with a center of gravity of a rigid mass placed above the slider ABS. In block 1020, adjustments to the flexure may be calculated to yield zero slider pitch and roll angles. In block 1030, the flexure may be adjusted based on the measurements and calculations. In block 1040, the process may be repeated until a predetermined manufacturing tolerance is achieved.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A method of adjusting a static torque on a slider in a head-gimbal assembly, comprising
    placing a substantially rigid mass on an air-bearing surface of said slider; and
    while the substantially rigid mass is placed on the air-bearing surface of said slider
        measuring a static attitude of said slider;

calculating an adjustment intensity and an adjustment location for a flexure to achieve a zero slider static attitude; and adjusting said flexure based on the measurement and calculations.

2. The method of claim 1, wherein said measuring, calculating, and adjusting steps are repeated to achieve a predetermined manufacturing tolerance.

3. The method of claim 1, wherein the weight of said substantially rigid mass is equal to a gram load of said head-gimbal assembly.

4. The method of claim 1, wherein said substantially rigid mass is non-magnetic.

5. The method of claim 1, wherein said substantially rigid mass is electrostatically non-chargeable.

6. The method of claim 1, wherein said substantially rigid mass has a first surface to engage said slider ABS and a second surface having an angle of inclination with respect to said first surface.

7. The method of claim 6, wherein said first surface is substantially flat.

8. The method of claim 6, wherein said second surface has a zero angle of inclination.

9. The method of claim 6, wherein at least a portion of said second surface is specularly reflective.

10. The method of claim 1, wherein a center of gravity of said substantially rigid mass is vertically aligned with a center of air bearing forces of said slider ABS.

11. The method of claim 1, wherein said measurement is accomplished optically.

12. The method of claim 1, wherein said flexure adjustment includes heating said flexure using a non-contact heat source.

13. The method of claim 12 wherein said non-contact heat source is an excimer laser.

14. A system for adjusting a flexure in a head-gimbal assembly, Comprising:
   a head-gimbal assembly, including a load beam, an air-bearing slider, and a flexure connecting the slider to the load beam;
   a substantially rigid mass, separate from a disk, comprising a first surface for engaging an air-bearing surface (ABS) of said slider and a second opposing surface having an inclination angle with respect to said first surface;
   a non-contact slope detector to measure slider pitch and roll angles;
   a non-contact heat source to adjust said flexure; and
   a controller to receive said slider pitch and roll angle measurements and to control said non-contact heat source, wherein said measuring said slider pitch and roll angles and said adjusting said flexure are performed while said substantially rigid mass engages said ABS of said slider.

15. The system of claim 14, wherein said load beam includes a substantially rigid portion, said substantially rigid portion having an integral load dimple, said load beam having a nominal 'z' height under normal slider flying operations, and said load beam being elastically bent by a load pin to achieve said nominal 'z' height, prior to said mass being placed on said ABS.

16. The system of claim 15, wherein said load beam is further constrained by a retaining pin to prevent said load beam from disengaging from said load pin.

17. The system of claim 14, wherein said first surface of said mass is substantially flat.

18. The system of claim 14, wherein said second surface of said mass has a zero inclination angle with respect to said first surface.

19. The system of claim 14, wherein said non-contact slope detector includes a collimated light source to illuminate said second surface of said mass and an optical sensor to receive a pattern of reflected light from said illuminated second surface of said mass, said slope detector comparing said pattern of reflected light to a reference pattern to determine said slider pitch and roll angles.

20. The system of claim 19, wherein said optical sensor is a quad-cell.

21. The system of claim 19, wherein said optical sensor is a diode array.

22. The system of claim 19, wherein said optical sensor is a charge-coupled device.

23. The system of claim 14, wherein said non-contact heat source is an excimer laser.

24. The system of claim 14, wherein said controller comprises
   a desktop computer, having a keyboard for entering commands, a monitor for displaying system information, and a computer having a microprocessor-controlled motherboard, a hard disk drive, and a floppy disk drive; and
   software installed on said computer to calculate a desired location, intensity, and duration of heating said flexure, based on said slider pitch and roll angles measured by said detector.

25. A method for adjusting a static torque on a slider in a head-gimbal assembly, comprising
   vertically aligning a center of gravity of a rigid mass with a center of air bearing forces of said slider, said rigid mass being placed on an air bearing surface of said slider; and
   while the rigid mass is placed on the air bearing surface of said slider:
     measuring pitch and roll angles of said slider;
     calculating flexure adjustments to achieve zero slider pitch and roll angles;
     adjusting said flexure based on the measurements and calculations; and
     repeating said measurements, calculations, and adjustments until a predetermined manufacturing tolerance is met.

26. The method of claim 25, wherein said rigid mass is non-magnetic.

27. The method of claim 25, wherein said rigid mass is electrostatically non-chargeable.

28. The method of claim 25, wherein said rigid mass has a first surface to engage said slider ABS, said first surface being substantially flat to avoid rocking on said slider ABS, and a second surface having an inclination angle with respect to said first surface and at least a portion being specularly reflective.

29. The method of claim 25, wherein said second surface inclination angle is zero.

30. The method of claim 25, wherein the weight of said rigid mass is equal to a gram load of said head-gimbal assembly.

31. The method of claim 25, wherein said measurements are accomplished optically.

32. The method of claim 25, wherein said flexure adjustment includes heating said flexure using a non-contact heat source.

33. The method of claim 32, wherein said non-contact heat source is an excimer laser.

* * * * *